(12) United States Patent
Yamakura et al.

(10) Patent No.: US 7,419,028 B2
(45) Date of Patent: Sep. 2, 2008

(54) MOTORCYCLE

(75) Inventors: Yutaka Yamakura, Wako (JP); Takero Shibukawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 172 days.

(21) Appl. No.: 11/218,706

(22) Filed: Sep. 1, 2005

(65) Prior Publication Data

US 2006/0076175 A1 Apr. 13, 2006

(30) Foreign Application Priority Data

Sep. 30, 2004 (JP) .............................. 2004-286736

(51) Int. Cl.
*B60K 8/00* (2006.01)
*B62K 19/30* (2006.01)

(52) U.S. Cl. ....................... 180/291; 180/226

(58) Field of Classification Search ................. 180/226, 180/291

See application file for complete search history.

(56) References Cited

U.S. PATENT DOCUMENTS

| 4,327,812 | A | * | 5/1982 | Tominaga et al. | ........... 180/226 |
| 4,327,930 | A | * | 5/1982 | Tominaga et al. | ........... 280/284 |
| 5,921,339 | A | * | 7/1999 | Matsuura | ..................... 180/219 |
| 6,508,326 | B2 | * | 1/2003 | Kido et al. | ................... 180/226 |
| 6,578,653 | B2 | * | 6/2003 | Nagai | .......................... 180/230 |
| 6,591,934 | B2 | * | 7/2003 | Tsutsumikoshi | ............ 180/291 |
| 2006/0065462 | A1 | * | 3/2006 | Ishida et al. | ................. 180/227 |

FOREIGN PATENT DOCUMENTS

| DE | 10125032 | | 12/2001 |
| JP | 63-35477 | | 7/1988 |
| JP | 2002-87364 | | 3/2002 |
| JP | 2004034777 A | * | 2/2004 |

OTHER PUBLICATIONS

GPTO Office Action issued by the GPTO on Dec. 22, 2006.

* cited by examiner

*Primary Examiner*—Lesley D. Morris
*Assistant Examiner*—Daniel Yeagley
(74) *Attorney, Agent, or Firm*—Hamre, Schumann, Mueller & Larson, P.C.

(57) ABSTRACT

In a motorcycle, a pivot plate on a drive shaft side is arranged closer to a vehicle body center axis side than the drive shaft and, at the same time, a swing arm mounting portion of the pivot plate in the vicinity of the drive shaft is flattened. Further, a lower cross pipe is extended between the left and right pivot plates in a state that the lower cross pipe projects from the pivot plate on the drive shaft side, a down tube is lowered from a head pipe, a lower pipe is extended rearwardly in the longitudinal direction of a vehicle body frame from a lower end of the down tube, and a rear end of the lower pipe is connected to a projecting portion of the lower cross pipe thus offsetting the pivot plate arranged closer to the drive shaft side than the lower pipe to the vehicle body center axis side.

2 Claims, 8 Drawing Sheets

MOTORCYCLE

FIELD OF THE INVENTION

The present invention relates to a motorcycle which includes a drive shaft for driving a rear wheel and a vehicle body frame which corresponds to the drive shaft.

BACKGROUND OF THE INVENTION

There has been known a motorcycle having a vehicle body frame which conforms to a shaft drive method. For example, see Japanese Accepted Patent Publication Sho63 (1988)-35477 (page 6, FIG. 4)

According to the figure, the conventional rear arm bearing structure of the motorcycle is constituted of a structure in which a propeller shaft is accommodated in a rear arm, and the rear arm is mounted on a pair of left and right brackets (including bearing pipes) which are integrally formed on the main frame.

However, in the rear arm bearing structure of the motorcycle described above, the pair of left and right brackets (pivot plates) have U-shaped bent portions, wherein when a force which bends the bent portions is increased and, the irregularities of the force applied to the bent portions are also increased depending on parts of the bent portions and hence, it is difficult to increase the strength of pivot plates while reducing the weight of the motorcycle.

Accordingly, it is an object of the present invention to provide a motorcycle which can increase the strength of a pivot plate.

BRIEF SUMMARY OF THE INVENTION

The present invention is directed to a motorcycle in which left and right pivot plates are formed on a vehicle body frame side, a swing arm is mounted on the pivot plates in a state that the swing arm is vertically swingable, a rear wheel is mounted on a rear portion of the swing arm, and an engine output is transmitted to the rear wheel by way of a drive shaft, wherein the pivot plate on the drive shaft side is arranged closer to a vehicle body center side than the drive shaft and, at the same time, a portion of the pivot plate in the vicinity of the drive shaft is flattened.

In addition, the motorcycle can further be characterized in that a cross pipe is extended between the left and right pivot plates in a state that the cross pipe projects from the pivot plates on the drive shaft side, and a down tube is lowered from a head pipe which constitutes the a vehicle body frame, a lower pipe is extended rearwardly in the longitudinal direction of the vehicle body from a lower end of the down tube, and a rear end of the lower pipe is connected to a projecting portion of the cross pipe thus offsetting the pivot plate arranged closer to the drive shaft side than the lower pipe to the vehicle body center side.

Further, the swing arm of the motorcycle is fastened using one bolt which penetrates the left and right pivot plates.

According to the pivot plates of present invention, the pivot plate on the drive shaft side is arranged closer to the vehicle body center side than the drive shaft and, at the same time, the portion of the pivot plate in the vicinity of the drive shaft is flattened and hence, a load from the swing arm is applied to the flattened portions whereby a force which bends the flattened portion is not generated at the flattened portion and the load is uniformly applied to the flattened portion. Accordingly, it is possible to obtain an advantage that the strength of the pivot plate in the vicinity of the drive shaft can be increased.

Further, since the pivot plate on the drive shaft side is arranged closer to the vehicle body center side than the drive shaft and the portion of the pivot plate in the vicinity of the drive shaft is flattened, in connecting the swing arm to the pivot plates on the drive shaft side using the bolt, the bolt can be easily inserted and the handling of a tool is facilitated thus enhancing the operability of the assembling.

With respect to the cross pipe of present invention, the cross pipe is extended between the left and right pivot plates in a state that the cross pipe projects from the pivot plates on the drive shaft side, and the rear end of the lower pipe of the vehicle body frame is connected to the projecting portion of the cross pipe thus offsetting the pivot plate arranged closer to the drive shaft side than the lower pipe to the vehicle body center side and hence, it is possible to arrange only the drive-shaft-side pivot plate on a vehicle body center side.

Further, the pivot plate arranged closer to the drive shaft side than the lower pipe is offset to the vehicle body center side by extending the cross pipe between the left and right pivot plates in a state that the cross pipe projects from the pivot plates on the drive shaft side and by connecting the rear end of the lower pipe of the vehicle body frame to the projecting portion of the cross pipe. Accordingly, it is unnecessary to offset the lower pipe to the vehicle body center side along with the offsetting of the drive-shaft-side pivot plate and hence, it is possible to set a wide distance between the left and right lower pipes. As a result, it is possible to increase the degree of freedom in designing parts such as an oil pan positioned in the vicinity of the lower pipes.

With respect to the swing arm of present invention, the swing arm is fastened using one bolt which penetrates the left and right pivot plates and hence, a shape (an area) of a connecting portion which transmits a load applied to the swing arm to the bolt can be increased and, at the same time, the shape becomes one tubular shape. As a result, a force (a stress) transmitted to the connecting portion can be decreased. Accordingly, it is possible to increase the strength of the swing arm and, at the same time, it is possible to increase the strength of the fastening structure which fastens the swing arm (including the left and right pivot plates).

DETAILED DESCRIPTION OF THE INVENTION

A best mode for carrying out the present invention is explained hereinafter in conjunction with attached drawings. Here, the drawings are observed in the direction of symbols. Terms "front", "rear", "left", "right", "upper" and "lower" indicate directions as viewed from a rider.

Figure 1:
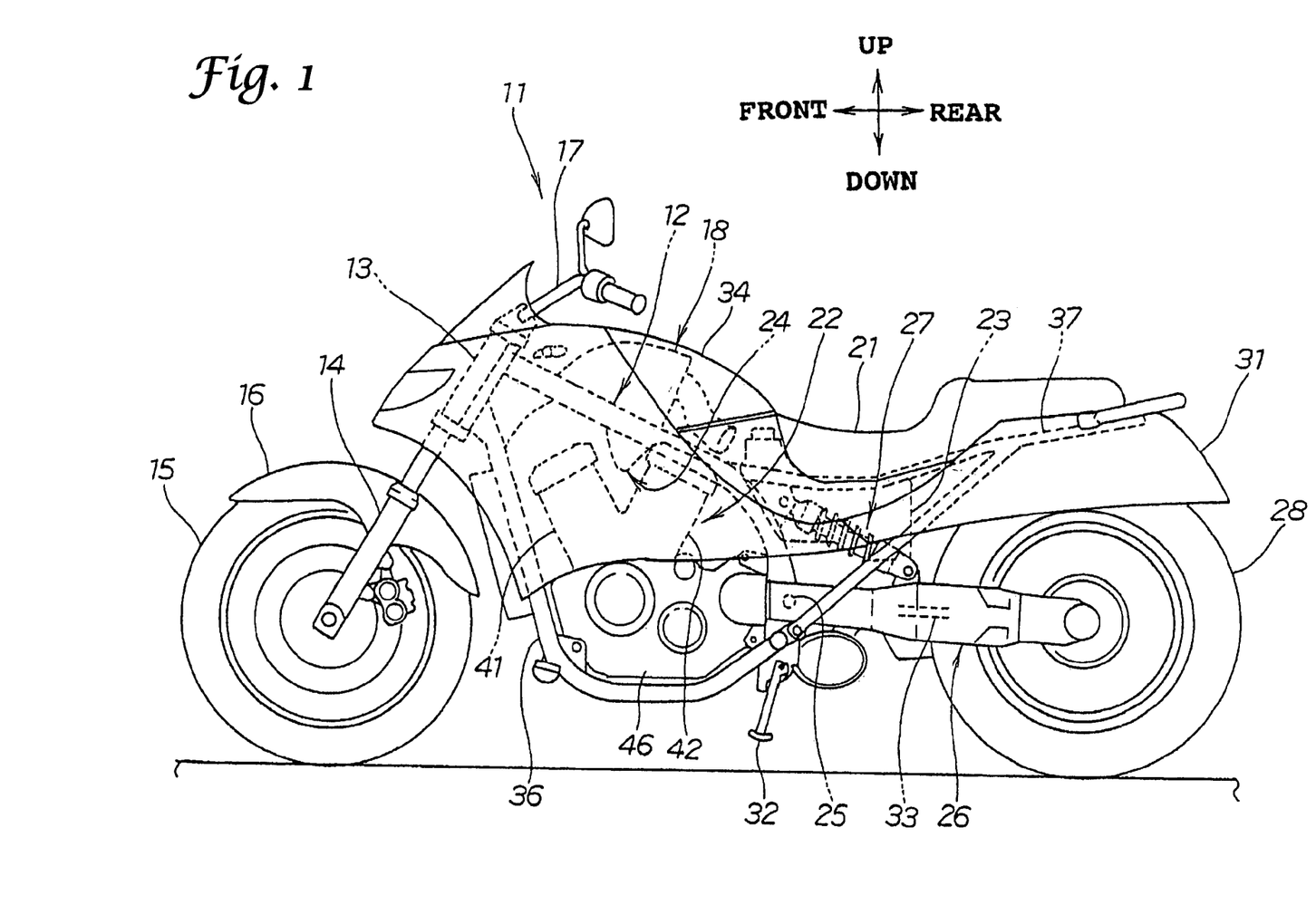
FIG. 1 is a side view of a motorcycle according to the present invention.

FIG. 1 is a side view of a motorcycle according to the present invention.

The motorcycle 11 includes a vehicle body frame 12, a front fork 14 which is mounted on a head pipe 13 of the vehicle body frame 12, a front wheel 15 and a front fender 16 which are mounted on the front fork 14, a handle 17 which is connected to the front fork 14, an air cleaner 18 which is arranged on a front upper portion of the vehicle body frame 12, a seat 21 which is mounted on an upper portion of the vehicle body frame 12, a V-type engine 22 which is arranged at the center of the vehicle body frame 12, a fuel tank 23 which is arranged behind the V-type engine 22 and below the seat 21, a carburetor 24 which is connected between an intake port of the V-type engine 22 and the air cleaner 18, a swing arm 26 which is mounted on a rear portion of the vehicle body frame 12 using a pivot shaft 25 which constitutes one bolt, a rear suspension 27 which suspends the center of the swing arm 26 from the vehicle body frame 12, a rear wheel 28 which is mounted on the swing arm 26, a rear fender 31 which covers the rear wheel 28, a stand 32 which is mounted on a lower portion of the vehicle body frame 12, and a drive shaft 33 which is connected to the V-type engine 22. Numeral 34 indicates a cover which covers the air cleaner 18.

Figure 2:
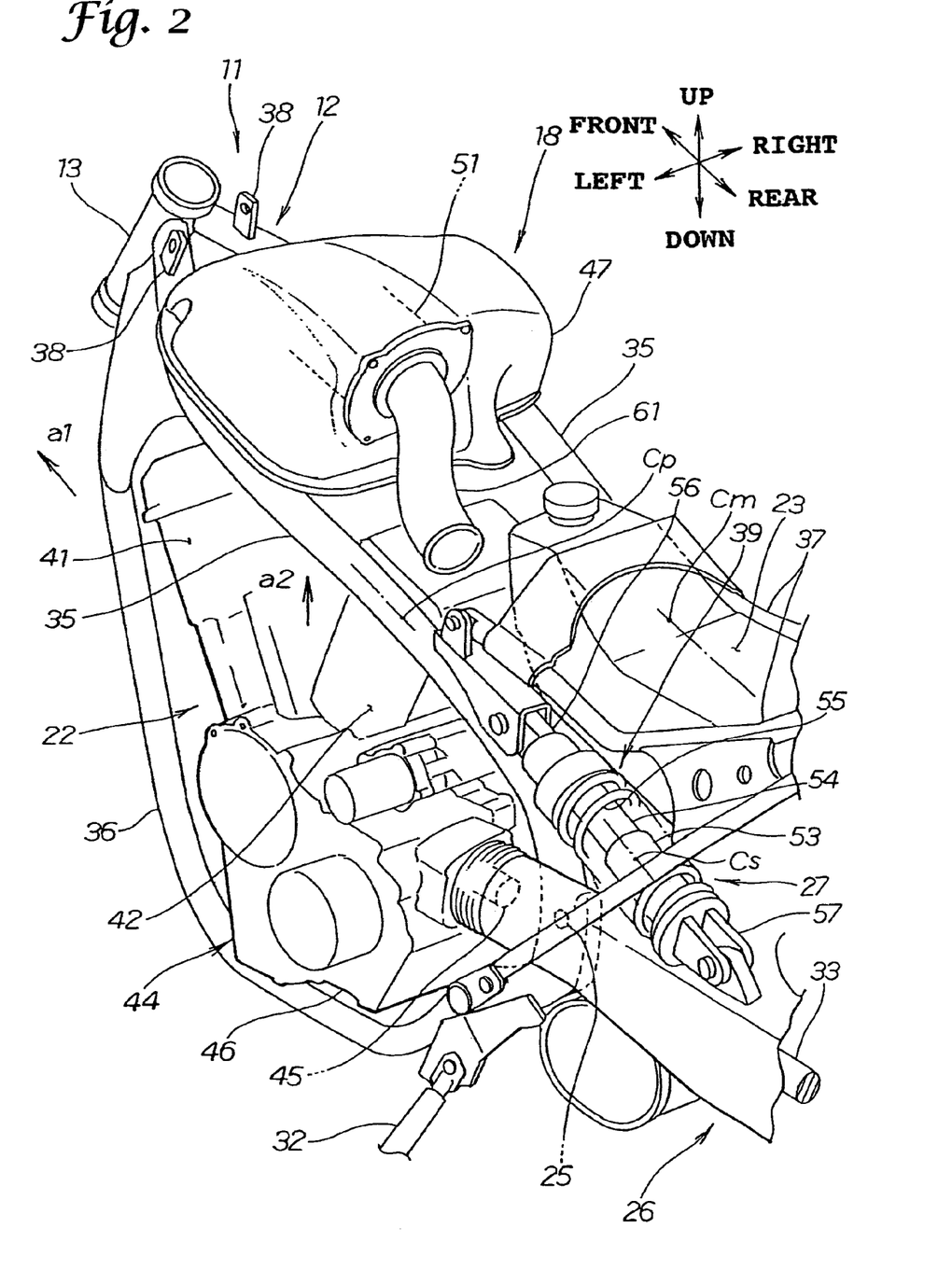
FIG. 2 is a perspective view of a motorcycle according to the present invention.

FIG. 2 is a perspective view of the motorcycle according to the present invention, wherein the motorcycle is shown in a state that the cover 34 and the seat 21 are removed.

The vehicle body frame 12 includes the head pipe 13, a pair of left and right main pipes 35, 35 which extend rearwardly from the head pipe 13, a pair of left and right down tubes 36, 36 (see FIG. 4) which extend rearwardly and downwardly from the head pipe 13, seat rails 37, 37 which are mounted on the down tubes 36, 36 and the main pipes 35, 35, and front hinges 38, 38 which are mounted on front portions of the main pipes 35, 35. The vehicle body frame 12 is specifically explained later in detail. Symbol Cm indicates a vehicle body center axis and symbol Cp indicates a center axis of the main pipe 35.

The V-type engine 22 includes a water-cooled two-cylinder front cylinder 41 which is inclined frontwardly (in the direction indicated by an arrow a1), a rear cylinder 42 which is inclined rearwardly, the air cleaner 18 which supplies fuel to the inside of the front and rear cylinders 41, 42, a transmission 44 which is connected with respective pistons which reciprocate in the inside of the front and rear cylinders 41, 42 by way of gears, and an output shaft 45 which is eventually connected with a final part of the transmission 44. Numeral 46 indicates an oil pan which is arranged below the transmission 44.

The rear suspension 27 includes a tube 53, a rod 54 which reciprocates in the inside of the tube 53, a spring 55, an upper end 56 which is formed on the rod 54, and a lower end 57 formed on the tube 53. Symbol Cs indicates a center axis of the rear suspension 27.

Figure 3:
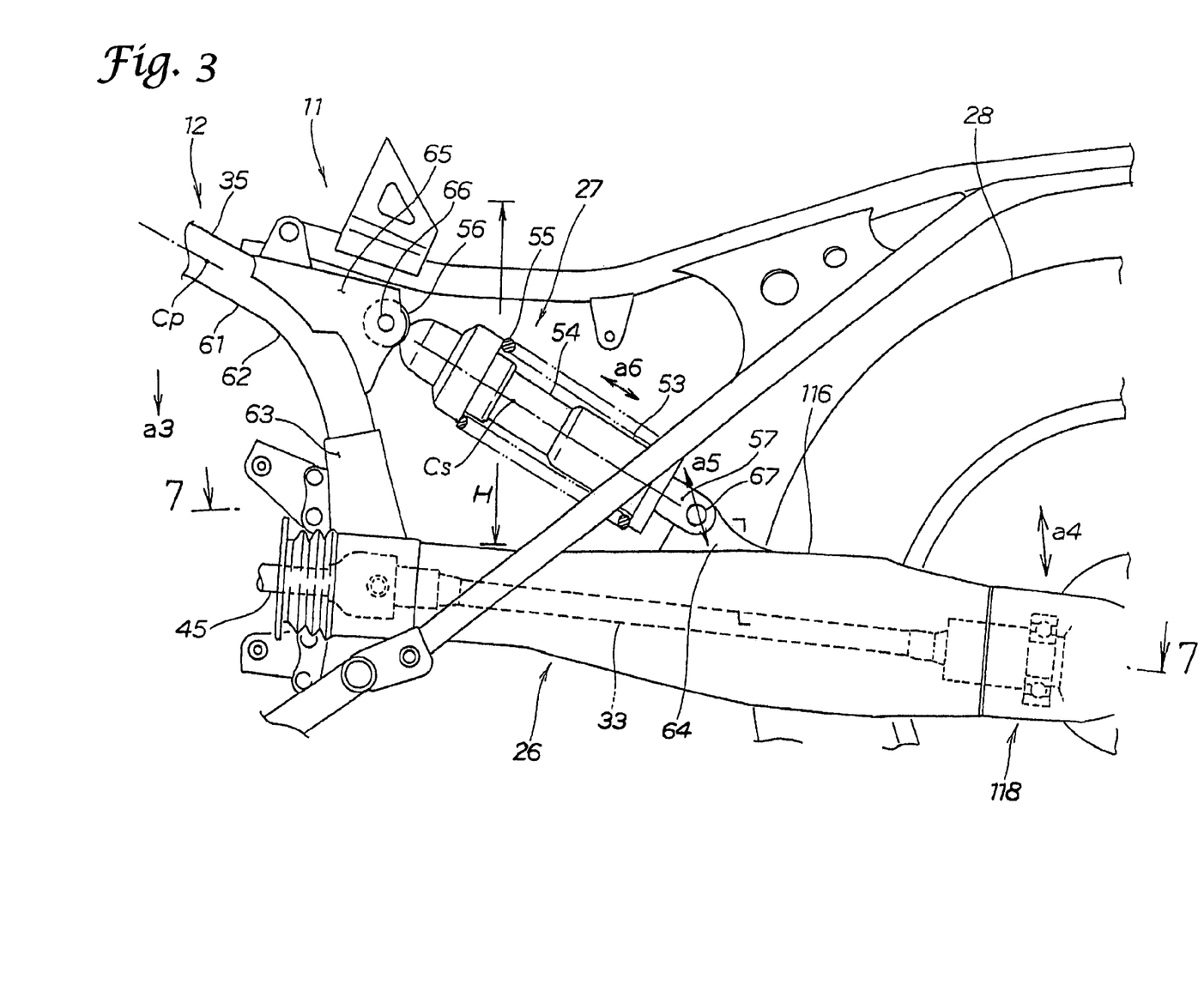
FIG. 3 is a view showing a state in which a swing arm and a rear suspension are connected to a vehicle body frame of the motorcycle of the present invention.

FIG. 3 is a view showing a state in which the swing arm and the rear suspension are connected to the vehicle body frame of the motorcycle of the present invention.

The motorcycle 11 has the following specific constitution. A bent portion 62 which extends downwardly (in the direction indicated by an arrow a3) is formed on rear portion 61 of the left main pipe 35 of the vehicle body frame 12, a pivot plate 63 arranged on a drive shaft 33 side is mounted on the bent portion 62, the swing arm 26 is connected to the pivot plate 63, a lower connecting bracket 64 is mounted on the swing arm 26, an upper connecting bracket 65 is mounted on the bent portion 62, an upper end 56 of the rear suspension 27 is connected to the upper connecting bracket 65 using a pin 66, a lower end 57 of the rear suspension 27 is connected to the lower connecting bracket 64 using a pin 67, whereby swing arm 26 is swung as indicated by an arrow a4 for an impact applied to the rear wheel 28 and, at the same time, the lower connecting bracket 64 is displaced as indicated by an arrow a5, and the rear suspension 27 is extended or contracted as indicated by an arrow a6.

Here, "the pivot plate 63 on the drive shaft 33 side" means the left pivot plate 63.

Figure 4:
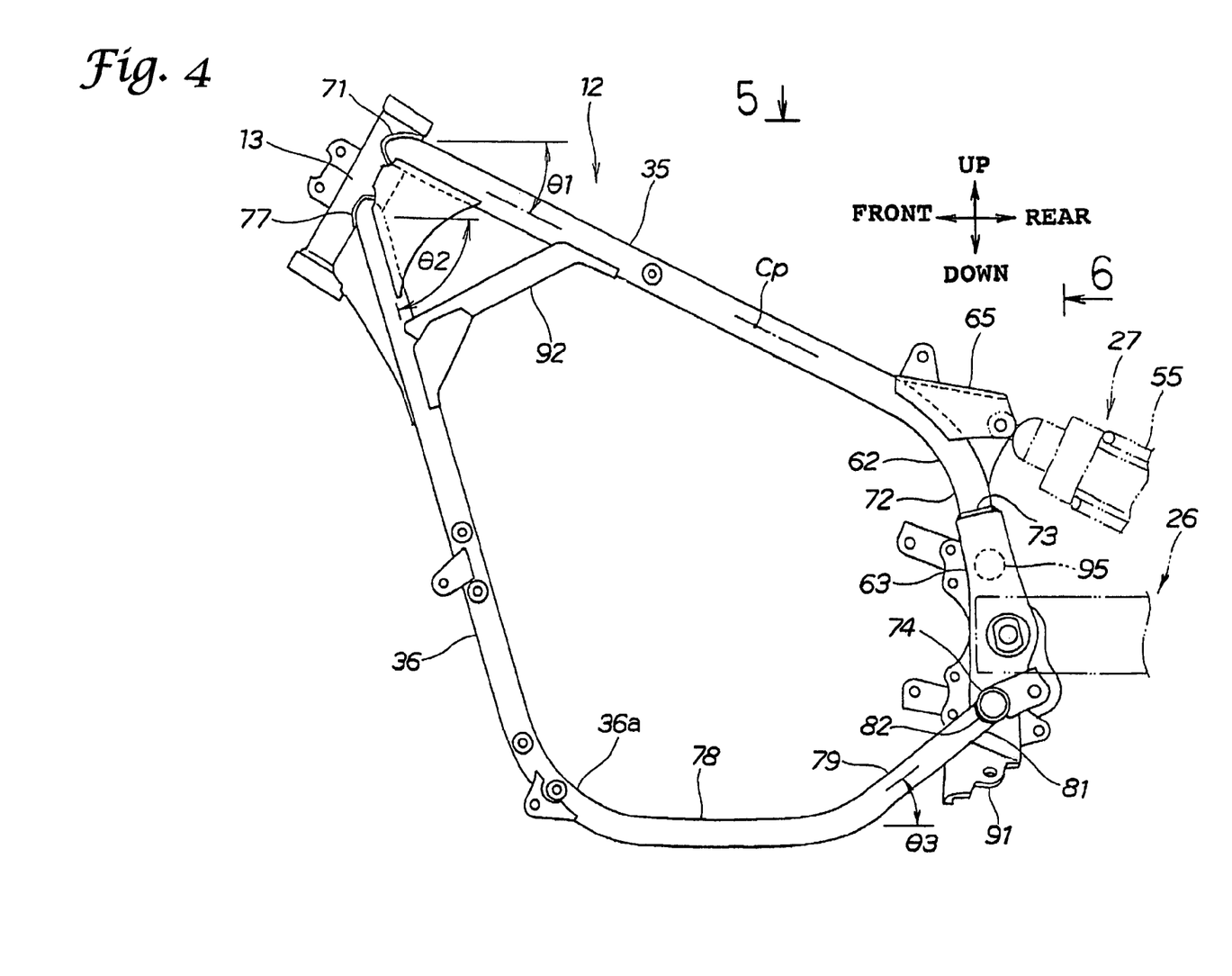
FIG. 4 is a side view showing a vehicle body frame which is adopted in the motorcycle of the present invention.
Figure 5:
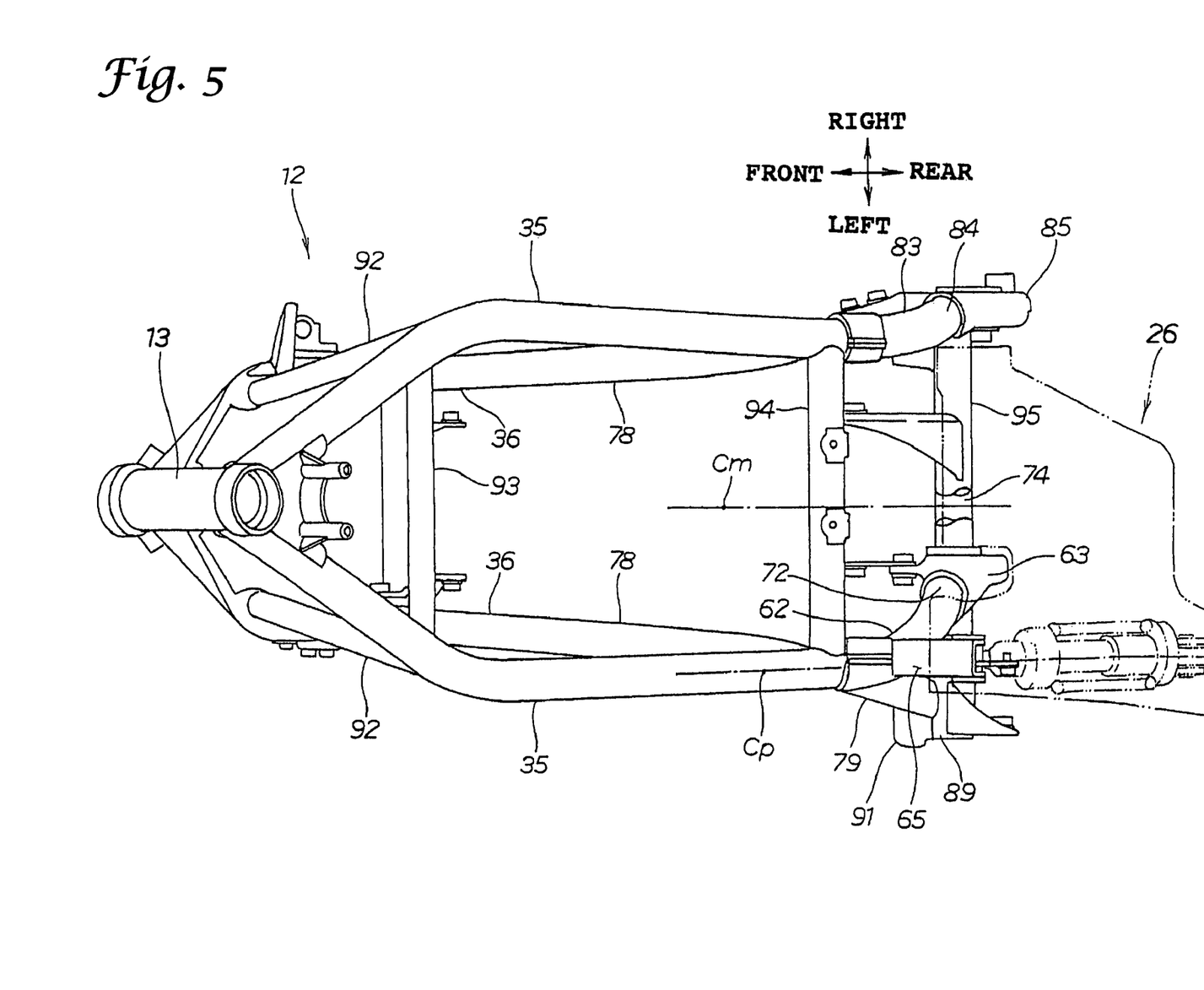
FIG. 5 is a view as viewed in the direction of an arrow 5 in FIG. 4.
Figure 6:
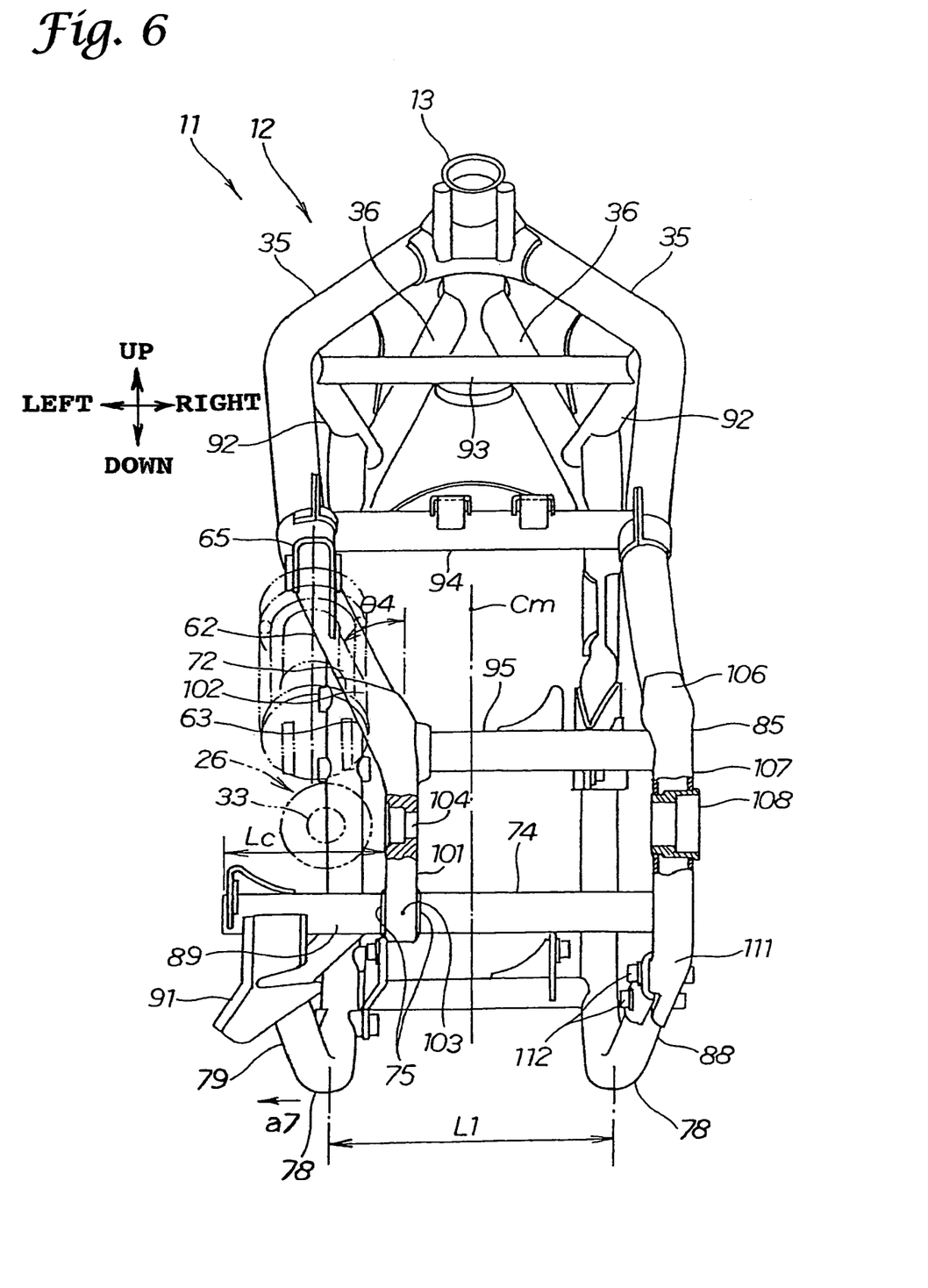
FIG. 6 is a view as viewed in the direction of an arrow 6 in FIG. 4.

Next, the vehicle body frame 12 is specifically explained in conjunction with FIG. 4 to FIG. 6.

FIG. 4 is a side view of the vehicle body frame which is adopted in the motorcycle of the present invention.

In the vehicle body frame 12, the left main pipe 35 is mounted on the head pipe 13 by way of a welded portion (including a bead) 71 in a state that the left main pipe 35 is downwardly inclined by an angle $\theta 1$ with respect to a horizontal plane, the bent portion 62 of the left main pipe 35 is formed approximately vertical, the pivot plate 63 is mounted on an end 72 of the bent portion 62 by way of welded portion (including beads) 73, and an end of the pivot plate 63 is mounted or a lower cross pipe 74 which constitutes a cross pipe by way of a welded portion (including beads) 75 (see FIG. 6). Further, the let down tube 36 is mounted on the head pipe 13 by way of a welded portion (including beads) 77 in a state that the left down tube 36 is downwardly inclined by an angle $\theta 2$ with respect to a horizontal plane, a lower pipe 78 is extended horizontally and rearwardly in the longitudinal direction of the vehicle body from a lower end 36a of the down tube 36, a rear pipe portion 79 of the lower pipe 78 is formed in a state that the rear pipe portion 79 is inclined upwardly by an angle $\theta 3$ with respect to a horizontal plane, and a rear end 81 of the lower pipe 78 is connected to the lower cross pipe 74 (mounted by way of welded portion 82).

FIG. 5 is a view as viewed in the direction of an arrow 5 in FIG. 4 and also is a plan view of the vehicle body frame 12.

Also in the vehicle body frame 12, the right main pipe 35 is mounted on the head pipe 13 by welding, while the right pivot plate 85 is mounted on an end 84 of the bent portion 83.

FIG. 6 is a view as viewed in the direction of an arrow 6 in FIG. 4 and also is a back view of the vehicle body frame 12.

In the vehicle body frame 12, the right pivot plate 85 which is shown in a right lower portion of FIG. 6 is welded to the lower cross pipe 74, the right down tube 36 is welded to the head pipe 13, the lower pipe 78 which is formed contiguously with the right down tube 36 is horizontally and rearwardly extended in the longitudinal direction of the vehicle body, a rear pipe portion 88 which is formed contiguously with a lower pipe 78 is bent upwardly, and an end of the rear pipe portion 88 is connected to the pivot plate 85.

Further, the vehicle body frame 12 is bent by an angle $\theta 4$ with respect to a vertical plane such that the bent portion 62 of the left main pipe 35 is arranged close to a vehicle body center axis Cm side. On the other hand, the rear pipe portion 79 of the down tube 36 is directed upwardly and, at the same time, is bent outwardly (in the direction indicated by an arrow a7) such that the rear pipe portion 79 is arranged away from the vehicle body center axis Cm, and the rear end 81 of the rear pipe portion 79 (see FIG. 4) is welded to a projecting portion 89 of the lower cross pipe 74.

In the drawing, numeral 91 indicates a stand bracket which is mounted on the projecting portion 89 of the lower cross pipe, numerals 92, 92 indicate left and right stiffeners which are mounted between the pair of left and right main pipes 35, 35 on the head pipe 13 side and the pair of left and right down tubes 36, 36, numeral 93 indicates a front upper cross pipe which is mounted between the left and right stiffeners 92, 92, numeral 94 indicates a center upper cross pipe which is mounted between the pair of left and right main pipes 35, 35 at the center, numeral 95 indicates a rear upper cross pipe which is mounted between the left and right pivot plates 63, 85, and symbol Lc indicates a distance of the cross pipe (lower cross pipe) 74 which is projected from the pivot plate 63 on the drive shaft 33 side, that is, a length of the projecting portion 89.

Pivot plate 63 is the pivot plate on the drive shaft 33 side, wherein the pivot plate is arranged closer to the vehicle body center Cm side than the drive shaft 33 and, at the same time, a swing arm mounting portion 101 which constitutes a portion in the vicinity of the drive shaft 33 is flattened. To be more specific, an upper end portion 102 which is mounted on the end 72 of the bent portion 62 of the left main pipe 35 is formed, a swing arm mounting portion 101 which is formed contiguously with the upper end portion 102 is arranged closer to the vehicle body center axis Cm side than the drive shaft 33 and, at the same time, the swing arm mounting portion 101 is extended from the upper end portion 102 in parallel to the vehicle-body center axis Cm, a lower end portion 103 which constitutes an end of the swing arm mounting portion 101 is mounted on the lower cross pipe 74, and a pivot hole 104 is formed in the center of the swing arm mounting portion 101.

Pivot plate 85 forms an upper end portion 106 which is mounted on the right main pipe 35, forms a swing arm mounting portion 107 which is contiguously formed with the upper end portion 106, and mounts a pivot hole member 108 on the center of the swing arm mounting portion 107, wherein a lower end portion 111 is formed contiguously with the swing arm mounting portion 107, and the lower end portion 111 is connected to the right down tube 36 (the lower pipe 78) using bolts 112.

Next, the swing arm 26 which is connected to pivot plates 63, 85 is explained.

Figure 7:
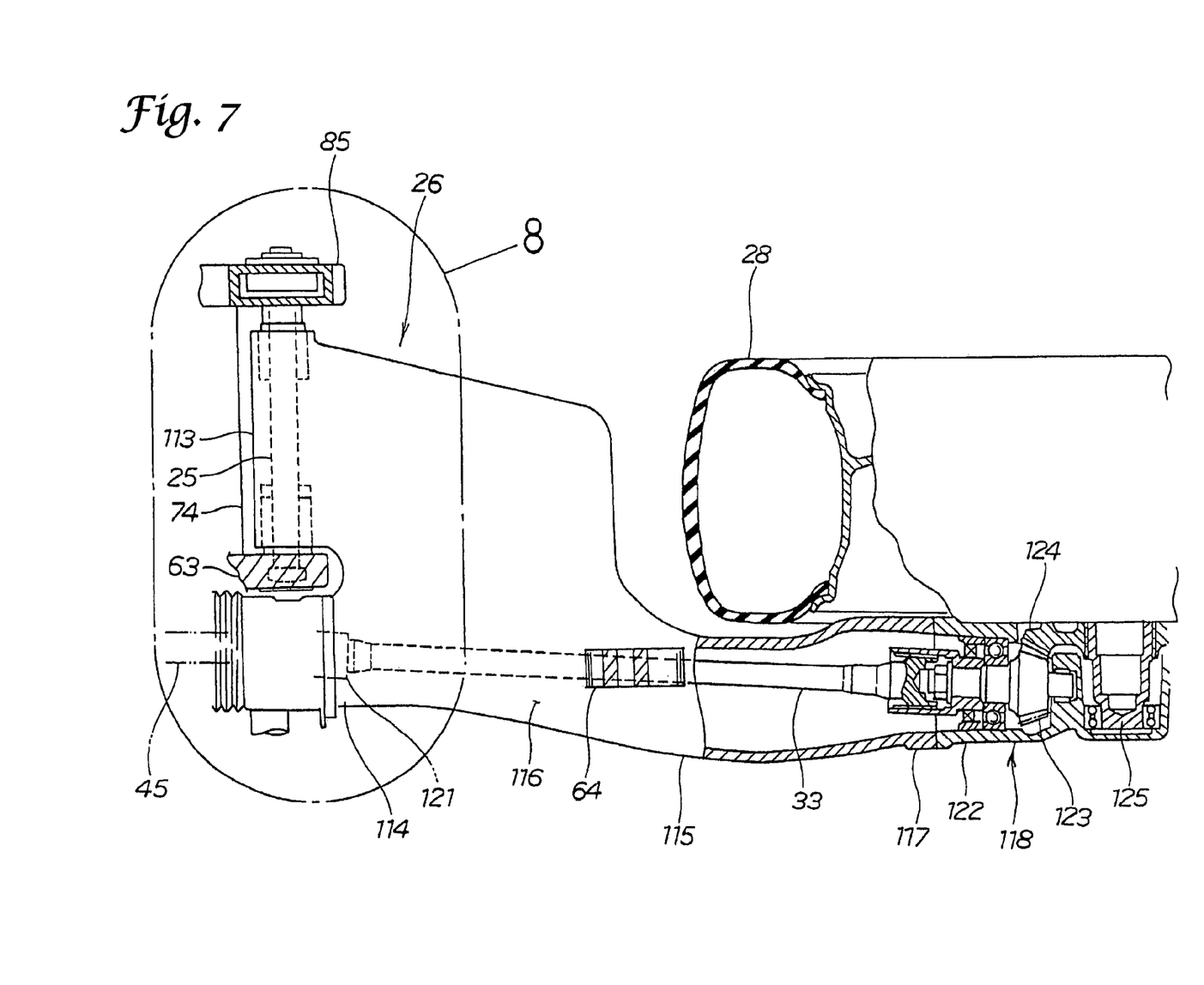
FIG. 7 is a cross-sectional view taken along a line 7-7 in FIG. 3.

FIG. 7 is a cross-sectional view taken along a line 7-7 in FIG. 3 and shows the swing arm 26.

Swing arm 26 forms a connecting portion 113 which is connected to the pivot plates 63, 85, a shaft connecting port 114 is formed contiguously with the connecting portion 113, one arm portion 115 is formed contiguously with the connecting portion 113, the lower connecting bracket 64 is mounted on an upper surface 116 of the arm portion 115, and the rear wheel 28 is mounted on a rear portion 117 of the arm portion 115 by way of a final drive 118. The detail of the connection is explained in conjunction with FIG. 8.

Arm portion 115 also functions as a shaft case which covers the drive shaft 33.

Drive shaft 33 is connected to an output shaft 45 of the transmission 44 (see FIG. 2) of the V-type engine 22 (see FIG. 2) by way of a universal joint 121, and transmits an engine output to the final drive 118.

Final drive 118 includes the drive shaft 33, a final case 122 which is mounted on the rear portion 117 of the arm portion 115, a first bevel gear 123 which is connected to an output end of the drive shaft 33, a second bevel gear 124 which is meshed with the first bevel gear 123, and a rear wheel axle 125 which is integrally fitted in the second bevel gear 124 and is supported in a cantilever manner, and drives the rear wheel 28 of the motorcycle 11.

Next, the connection structure of the swing arm 26 is explained in detail.

Figure 8:
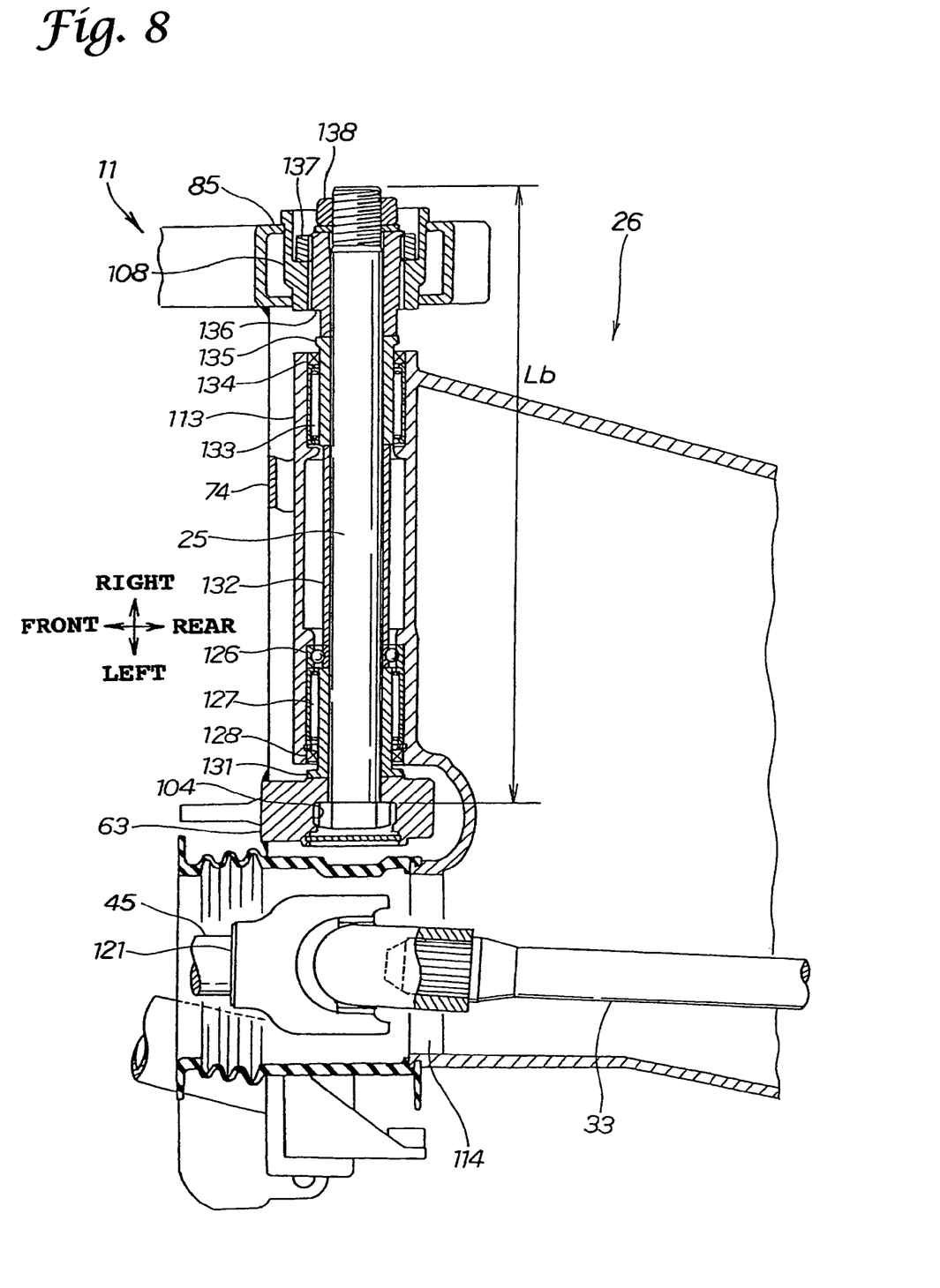
FIG. 8 is a detailed cross-sectional view of a portion 8 in FIG. 7.

FIG. 8 is a detailed cross-sectional view of a portion 8 in FIG. 7.

Swing arm 26 is configured as follows. First and second bearings 126, 127 and a first seal member 128 are fitted in a left portion of the connecting portion 113, a first bushing 131 is fitted in the first seal member 128 and the second bearing 127, a first collar 132 which is brought into contact with the first bearing 126 is arranged at a center thereof, a third bearing 133 and a second seal member 134 are fitted in a right portion of the connecting portion 113, a second bushing 135 is fitted in the second seal member 134 and a third bearing 133, a pressing member 136 which presses a second bushing 135 is threaded into the pivot hole member 108 of the right pivot plate 85, the pressing member 136 is retained by a rotation preventing nut 137, and the pivot shaft 25 which constitutes one bolt is fitted in the pivot hole 104 formed in the left pivot plate 63 and, at the same time, is inserted into the right pressing member 136. Further, a nut 138 is threaded on the bolt (the pivot shaft) 25 such that a given axial force is obtained (for example, the axial force being controlled in response to a torque).

Pivot shaft 25 is a bolt which has a length Lb and penetrates the left and right pivot plates 63, 85.

Here, in assembling the connecting portion 113 using one bolt 25, an assembling jig (not shown in the drawing) is used.

Next, the manner of operation of the motorcycle of the present invention is explained.

As shown in FIG. 6, in the motorcycle 11, the pivot plate 63 on the drive shaft 33 side is arranged closer to the vehicle body center (vehicle body center shaft) Cm side than the drive shaft 33 and, at the same time, the portion (swing arm mounting portion) 101 of the pivot plate 63 in the vicinity of the drive shaft 33 is flattened. Hence, when load from the swing arm 26 is applied to the flattened swing arm mounting portion 101, the force which bends the flattened portion is not localized at the flattened swing arm mounting portion 101; it is uniformly distributed to the flattened portion. Accordingly, it is possible to obtain an advantage of increased strength of the swing arm mounting portion 101 of the pivot plate 63 in the vicinity of the drive shaft 33.

Further, in the motorcycle 11, since the pivot plate 63 on the drive shaft 33 side is arranged closer to the vehicle body center Cm side than the drive shaft 33 and, at the same time, the swing arm mounting portion 101 of the pivot plate 63 in the vicinity of the drive shaft 33 is flattened, in connecting the swing arm 26 to the pivot plate 63 using the bolt 25, bolt 25 can be easily inserted and the handling of a tool is facilitated thus enhancing the operability of assembling.

As shown in FIG. 4 and FIG. 6, in the motorcycle 11, the lower pipe 78 is extended rearwardly in the longitudinal direction of the vehicle body from the lower end 36a of the down tube 36, and the rear end 81 of the lower pipe 78 is connected to the projecting portion 89 of the lower cross pipe 74 thus offsetting the pivot plate 63 arranged closer to the drive shaft 33 side than the lower pipe 78 to the vehicle body center side and hence, it is possible to arrange only the drive-shaft-33-side pivot plate 63 on a vehicle body center (vehicle body center axis Cm) side.

Further, in the motorcycle 11, the lower pipe 78 is extended rearwardly in the longitudinal direction of the vehicle body from the lower end 36a of the down tube 36, and the rear end 81 of the lower pipe 78 is connected to the projecting portion 89 of the lower cross pipe 74 thus offsetting the pivot plate 63 arranged closer to the drive shaft 33 side than the lower pipe 78 to the vehicle body center side. Accordingly, it is unnecessary to offset the lower pipe 78 to the vehicle body center side along with the offsetting of the drive-shaft-33-side pivot plate 63 and hence, it is possible to set a wide distance L1 (see FIG. 6) between the left and right lower pipes 78, 78. As a result, it is possible to increase the degree of freedom in designing parts such as an oil pan 46 (see FIG. 2) of the V-type engine.

In the motorcycle 11 shown in FIG. 8, the swing arm 26 is fastened using one bolt 25 which penetrates the left and right pivot plates 63, 85 and hence, a shape (an area) of the connecting portion 113 which transmits a load applied to the swing arm 26 to the bolt 25 can be increased and, at the same time, the shape becomes one tubular shape. As a result, a force (a stress) transmitted to the connecting portion 113 can be decreased. Accordingly, it is possible to increase the strength of the swing arm 26 and, at the same time, it is possible to increase the strength of the fastening structure which fastens the swing arm 26 (including the left and right pivot plates 63, 85).

As shown in FIG. 6, in the motorcycle 11, the lower pipe 78 is extended rearwardly in the longitudinal direction of the vehicle body from the lower end 36a of the down tube 36, the rear end 81 of the lower pipe 78 is connected to the projecting portion 89 of the lower cross pipe 74, and the stand bracket 94 is mounted on the projecting portion 89 and the rear end 81 of the lower pipe 78 and hence, it is possible to disperse a load applied to the stand bracket 91 to the projecting portion 89 and the lower pipe 78 whereby the strength of the projecting portion 89 and the lower pipe 78 can be enhanced.

Here, the motorcycle of the present invention is applicable to a three-wheeled vehicle and there is no problem in applying the motorcycle of the present invention to any general vehicle.

The motorcycle according to the present invention is applicable to various kinds of motorcycles, that is, motorcycles in a wide range from an on-road vehicle to an off-road vehicle.

What is claimed:

1. A motorcycle having a vehicle body supported by front and rear wheels, said vehicle body having a vehicle body centerline, said motorcycle also having an engine and a drive shaft, said drive shaft being offset from said vehicle body centerline, said engine having an engine output transmitted to the rear wheel by said drive shaft, said motorcycle comprising:

a frame having a pair of pivot plates; and a swing arm mounted on the pivot plates so as to swing vertically, said rear wheel being mounted on a rear portion of said swing arm;

wherein one of said pivot plates is on the drive shaft side of said vehicle body and is arranged closer to said vehicle body centerline than the drive shaft, said one of said pivot plates having a portion nearest said drive shaft and a remaining portion;

wherein said portion nearest said drive shaft is flattened relative to said remaining portion; and wherein said frame includes a head pipe and a cross pipe extending between said pair of pivot plates, said cross pipe having a projecting portion on the drive shaft side of said one of said pivot plates on the drive shaft side, said cross pipe being positioned on a lower portion of said one of said pivot plates on the drive shaft side, said frame further including a down tube extending rearwardly from said head pipe and a lower pipe extending rearwardly from said down tube, said lower pipe connecting with said projecting portion of said cross pipe so that said lower pipe is arranged offset from said vehicle body centerline farther than said one of said pivot plates having a portion nearest said drive shaft.

2. The motorcycle according to claim 1, including a bolt extending between said pair of pivot plates and fastening said swing arm to said pivot plates.

* * * * *